United States Patent
Kim et al.

(10) Patent No.: US 10,987,805 B2
(45) Date of Patent: Apr. 27, 2021

(54) SYSTEM AND METHOD FOR BALANCE CONTROL OF HUMANOID

(71) Applicant: KOREA INSTITUTE OF SCIENCE AND TECHNOLOGY, Seoul (KR)

(72) Inventors: Jung Hoon Kim, Seoul (KR); Yonghwan Oh, Seoul (KR)

(73) Assignee: Korea Institute of Science and Technology, Seoul (KR)

(*) Notice: Subject to any disclaimer, the term of this patent is extended or adjusted under 35 U.S.C. 154(b) by 294 days.

(21) Appl. No.: 16/165,413

(22) Filed: Oct. 19, 2018

(65) Prior Publication Data

US 2019/0232490 A1 Aug. 1, 2019

(30) Foreign Application Priority Data

Jan. 30, 2018 (KR) .................. 10-2018-0011230

(51) Int. Cl.
- *B25J 9/00* (2006.01)
- *B25J 9/16* (2006.01)
- *B62D 57/032* (2006.01)

(52) U.S. Cl.
CPC .......... *B25J 9/1633* (2013.01); *B62D 57/032* (2013.01)

(58) Field of Classification Search
CPC ....... B25J 9/1633; B62D 57/032; G06F 19/00
See application file for complete search history.

(56) References Cited

U.S. PATENT DOCUMENTS

| 8,447,429 B2 | 5/2013 | Chang et al. |
| 2009/0271037 A1* | 10/2009 | Hong .................. B62D 57/032 700/253 |
| 2010/0286821 A1* | 11/2010 | Hong .................. B62D 57/032 700/245 |
| 2013/0173054 A1 | 7/2013 | Seo et al. |

FOREIGN PATENT DOCUMENTS

| JP | 6107338 B2 | 3/2017 |
| KR | 10-0958114 B1 | 5/2010 |
| KR | 10-1073496 B1 | 10/2011 |
| KR | 10-2013-0078886 A | 7/2013 |

OTHER PUBLICATIONS

Ko Yamamoto et al., "Switching Feedback Controllers Based on the Maximal CPI Sets for Stablization of Humanoid Robots", 9th IEEE-RAS International Conference on Humanoid Robots, Dec. 7-10, 2009, pp. 549-554.
Rick Middleton et al., "Non-Pathological Sampling for High Order Generalised Sampled—Date Hold Functions", Proceedings of American Control Conference, Jun. 1995, pp. 1498-1502.

* cited by examiner

*Primary Examiner* — Ian Jen
(74) *Attorney, Agent, or Firm* — Rabin & Berdo, P.C.

(57) ABSTRACT

A system for balance control of a humanoid includes a control input generation unit which determines Zero Momentum Position (ZMP) of the humanoid with respect to ground, and a control output generation unit which determines Center of Mass (CoM) position and velocity of the humanoid, wherein the control input generation unit and the control output generation unit determine the ZMP and the CoM position and velocity, respectively, by applying a discrete-time dynamics equation sampled by applying a non-pathological sampling frequency.

8 Claims, 8 Drawing Sheets

SYSTEM AND METHOD FOR BALANCE CONTROL OF HUMANOID

CROSS-REFERENCE TO RELATED APPLICATION

This application claims priority to Korean Patent Application No. 10-2018-0011230, filed on Jan. 30, 2018, and all the benefits accruing therefrom under 35 U.S.C. § 119, the contents of which in its entirety are herein incorporated by reference.

BACKGROUND

1. Field

The present disclosure relates to a system and method for balance control of a humanoid, and more particularly, to a balance control system and method for maintaining balance of humanoid more stably.

2. Description of the Related Art

In the case of biped or multiped robots such as humanoids, for stability determination and motion, in many cases, Center of Mass (CoM) information and Zero Moment Point (ZMP) information are used for balance control of robots. That is, for balance control of humanoids, when all dynamics equations for both feet beyond the degree of freedom are used, very complex computation is needed, requiring many time, so it is not suitable as a method for real-time balance control of robots.

One of the simplest methods for describing the relation between CoM and ZMP is to use a linear inverted pendulum model. The ZMP is a stability criterion of a humanoid, and the CoM represents the whole motion of a humanoid. According to the linear inverted pendulum model, computation necessary for balance control of the humanoid is performed by finding the CoM of the robot and simplifying a dynamics equation to a simple motion equation that describes a point mass.

However, in the case of conventional linear inverted pendulum model, the controllability of system is not guaranteed. That is, in discretization of a continuous-time dynamics equation that guarantees controllability, the conventional linear inverted pendulum model computes CoM and ZMP trajectories by performing discretization without full consideration of whether or not the discretized dynamics equation has controllability.

The discretized dynamics equation in which controllability is not guaranteed does not guarantee a property that an output value can move to any location by manipulation of an input value, causing a problem with stability and performance of the system.

Additionally, motion control is performed by inputting a constant value without any theoretical basis for initial position and velocity of CoM that can guarantee the balance control of the robot, and thus imbalance of the robot occurs frequently over time.

SUMMARY

The present disclosure is designed to solve the above-described problem, and therefore the present disclosure is directed to providing a control system and method for enabling balance control of a humanoid more stably by computing the relation between Center of Mass (CoM) and Zero Momentum Position (ZMP) trajectories through a dynamics equation that can guarantee controllability.

The present disclosure is further directed to providing a system and method for performing a task more stably by computing initial values of CoM for controlling balance of a humanoid stably.

A system for balance control of a humanoid according to an embodiment of the present disclosure includes a control input generation unit which determines ZMP of the humanoid with respect to ground, and a control output generation unit which determines CoM position and velocity of the humanoid, wherein the control input generation unit and the control output generation unit determine the ZMP and the CoM position and velocity, respectively, by applying a discrete-time dynamics equation sampled by applying a non-pathological sampling frequency.

The control output generation unit may determine the CoM position and velocity by applying the discrete-time dynamics equation represented by the following [Equation 4], and the control input generation unit may determine the ZMP by applying the discrete-time dynamics equation represented by the following [Equation 5].

In an embodiment, when a region in which both feet of the humanoid are located and a region defined between the both feet are defined as a supporting region, a closed loop system including the control input generation unit and the control output generation unit may be formed, the closed loop system may be defined as [Equation 6], and initial position and initial velocity of the CoM by which the ZMP is always located inside the supporting region may be computed through the above [Equation 6].

In an embodiment, a set of initial positions and initial velocities of the CoM may be computed as shown in the following [Equation 9].

In an embodiment, the $A_{2d}$ may be a diagonalizable matrix by the definition of controllability.

A method for balance control of a humanoid according to an embodiment of the present disclosure is a method for balance control of a humanoid using the system for balance control of a humanoid including a control input generation unit and a control output generation unit, and includes determining, by the control input generation unit, ZMP of the humanoid with respect to ground, and determining, by the control output generation unit, CoM position and velocity of the humanoid, wherein the control input generation unit and the control output generation unit may determine the ZMP and the CoM position and velocity, respectively, by applying a discrete-time dynamics equation sampled by applying a non-pathological sampling frequency.

In an embodiment, the control signal generation unit may determine the CoM position and velocity by applying the discrete-time dynamics equation represented by the following [Equation 4], and determine the ZMP by applying the discrete-time dynamics equation represented by the following [Equation 5].

In an embodiment, when a region in which both feet of the humanoid are located and a region defined between the both feet are defined as a supporting region, a closed loop system including the control input generation unit and the control output generation unit may be formed, the closed loop system may be defined as [Equation 6], and initial position and initial velocity of the CoM by which the ZMP is always located inside the supporting region may be computed through the above [Equation 6].

In an embodiment, a set of initial positions and initial velocities of the CoM may be computed as shown in the following [Equation 9].

In an embodiment, the $A_{2d}$ may be a diagonalizable matrix by the definition of controllability.

The system and method for balance control of a humanoid according to the present disclosure can control balance more stably by performing an operation based on initial data related to CoM position and velocity by which ZMP is located in the stable region.

Additionally, it is possible to control balance of a humanoid more precisely and stably by computing CoM and ZMP using a dynamics equation sampled by applying non-pathological sampling frequency.

DETAILED DESCRIPTION

Figure 1:
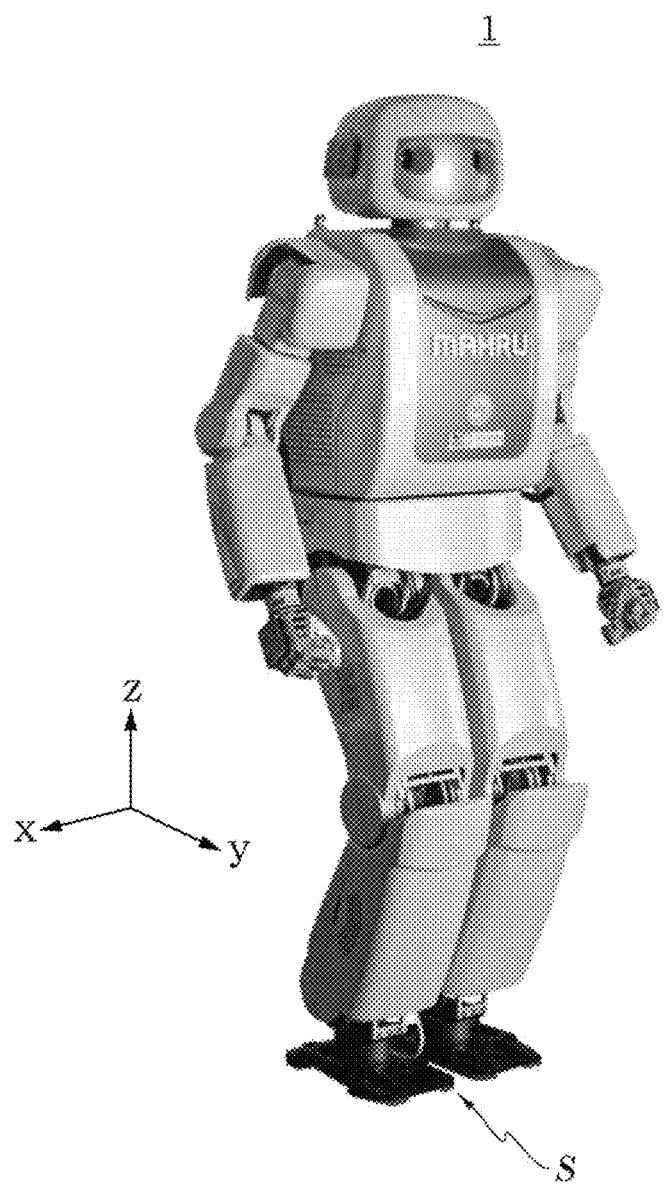
FIG. 1 is a diagram illustrating the concept of a humanoid.

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment can be embodied in other embodiment without departing from the spirit and scope of the present disclosure. It should be further understood that changes can be made to locations or arrangements of individual elements in each disclosed embodiment without departing from the spirit and scope of the present disclosure. Accordingly, the following detailed description is not intended to be taken in limiting senses, and the scope of the present disclosure is only defined by the appended claims along with the full scope of equivalents to which such claims are entitled. In the drawings, similar reference signs denote same or similar functions in many aspects.

The system for balance control of humanoid according to the embodiments may have aspects of entirely hardware, entirely software, or partially hardware and partially software. For example, each "unit" that constitutes the system as used herein may collectively indicate hardware and operating software that enables the hardware to operate. Furthermore, hardware may be a data processing device including a computer processing unit (CPU) or other processor. Furthermore, software operated by hardware may indicate a process being executed, an object, an executable, a thread of execution, and a program.

The terms as used herein are general terms selected as those being now used as widely as possible in consideration of functions, but they may vary depending on the intention of those skilled in the art or the convention or the emergence of new technology. Additionally, in certain cases, there may be terms arbitrarily selected by the applicant, and in this case, the meaning will be described in the corresponding description part of the specification. Accordingly, the terms as used herein should be interpreted based on the substantial meaning of the terms and the content throughout the specification, rather than simply the name of the terms.

Figure 2:
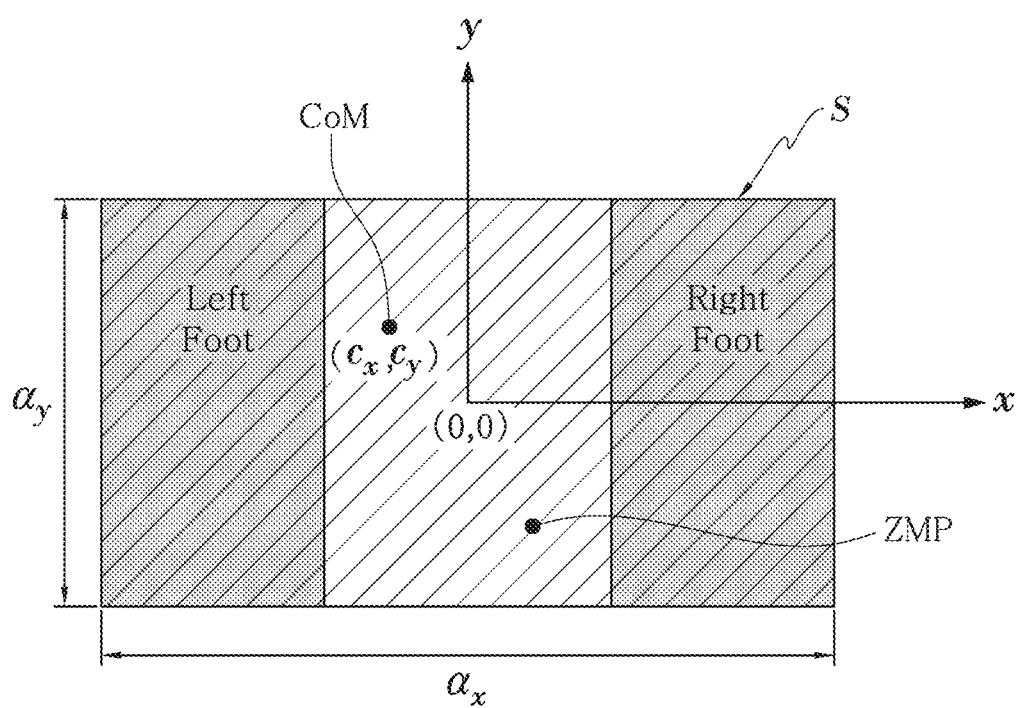
FIG. 2 is a graph showing the relation between a supporting region and CoM and ZMP.
Figure 3:
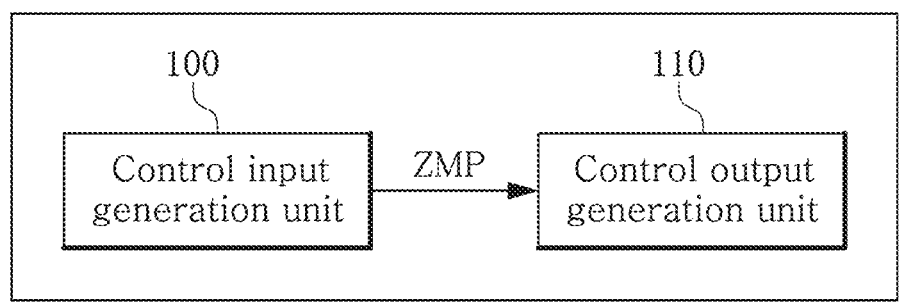
FIG. 3 is a block diagram of a system for balance control of a humanoid according to an embodiment of the present disclosure.
Figure 4:
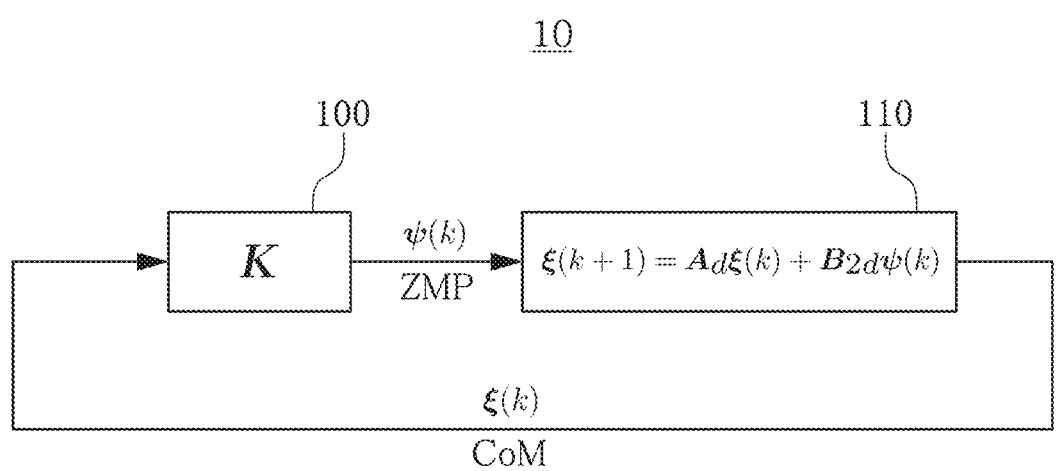
FIG. 4 is a block diagram showing a schematic architecture of a closed loop system according to an embodiment of the present disclosure.
Figure 5A:
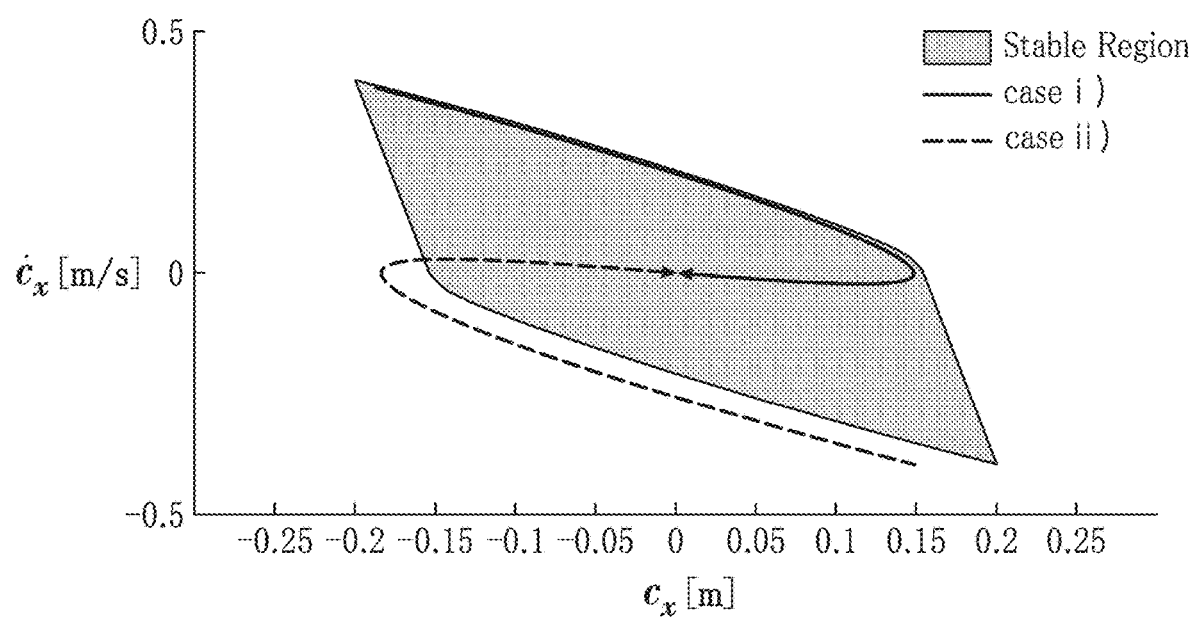
FIG. 5A is a graph showing changes in CoM($c_x$, $\dot{c}_x$) according to the position of the initial data.
Figure 5B:
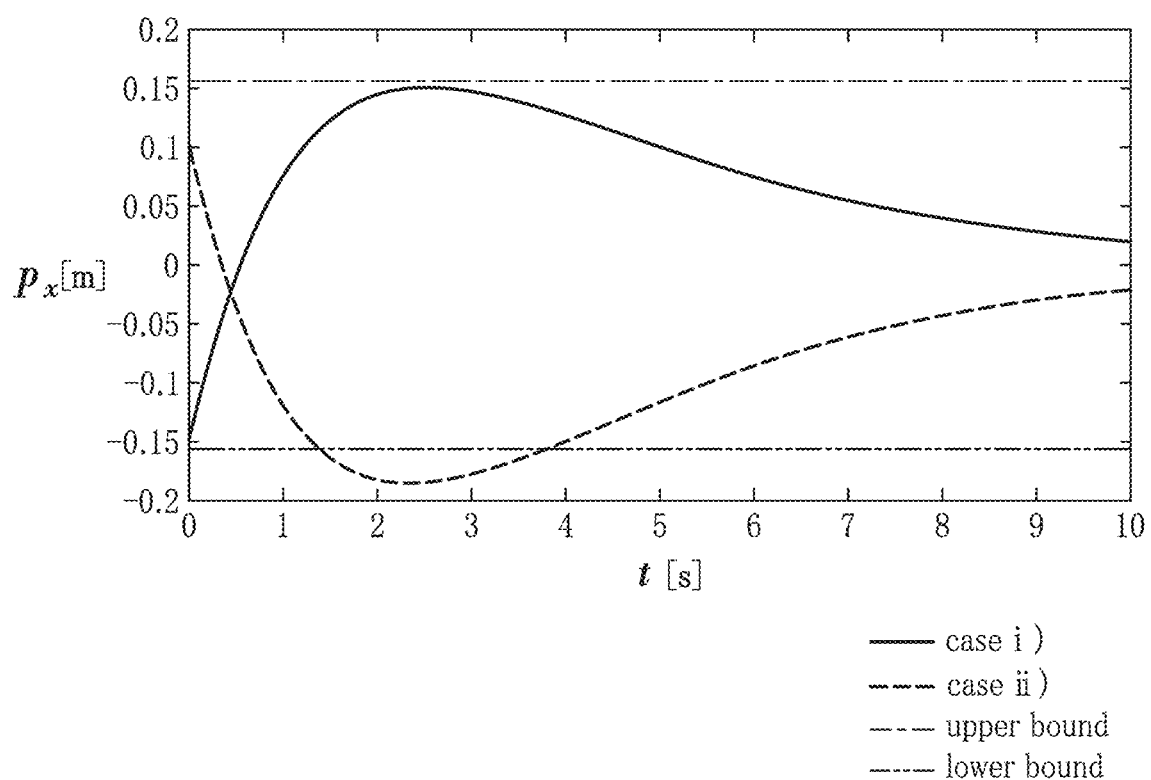
FIG. 5B is a graph showing changes in ZMP($P_x$) according to the position of the initial data.
Figure 6A:
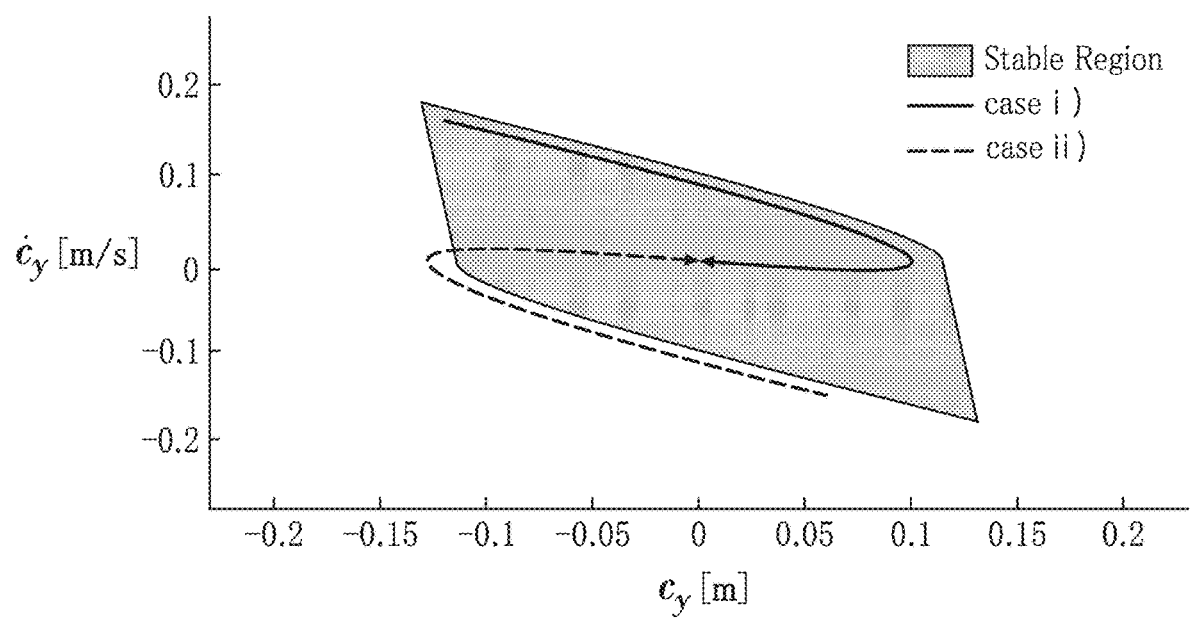
FIG. 6A is a graph showing changes in CoM($c_y$, $\dot{c}_y$) according to the position of the initial data.
Figure 6B:
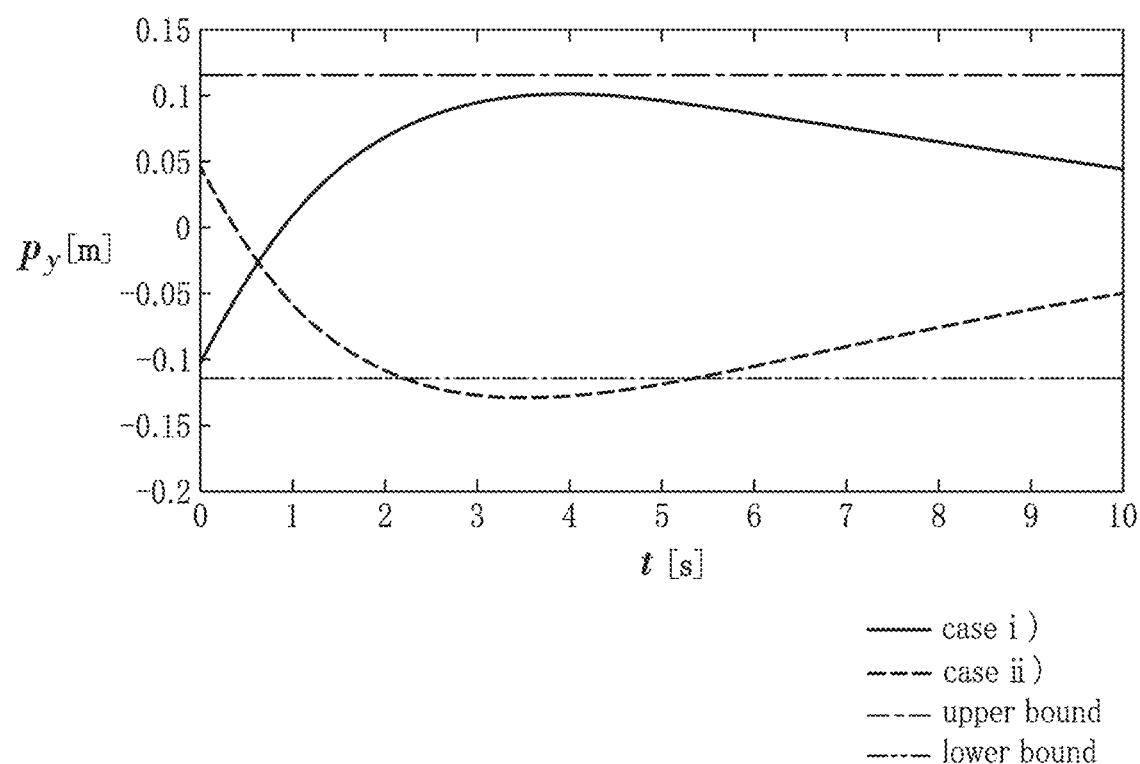
FIG. 6B is a graph showing changes in ZMP($P_y$) according to the position of the initial data.

FIG. 1 is a diagram illustrating the concept of a humanoid, FIG. 2 is a graph showing the relation between a supporting region and CoM and ZMP, FIG. 3 is a block diagram of a system for balance control of a humanoid according to an embodiment of the present disclosure, FIG. 4 is a block diagram showing a schematic architecture of a closed loop system according to an embodiment of the present disclosure, FIG. 5A is a graph showing changes in CoM($c_x$, $\dot{c}_x$) according to the position of the initial data, FIG. 5B is a graph showing changes in ZMP($P_x$) according to the position of the initial data, FIG. 6A is a graph showing changes in CoM($c_y$, $\dot{c}_y$) according to the position of the initial data, FIG. 6B is a graph showing changes in ZMP($P_y$) according to the position of the initial data.

Referring to FIGS. 1 to 6, the system 10 for balance control of a humanoid according to this embodiment includes a control input generation unit 100 and a control output generation unit 110. The system for balance control of a humanoid according to the embodiments and each device or unit that constitutes the system may have aspects of entirely hardware, or partly hardware and partly software. For example, each component of the system for balance control of a humanoid is intended to refer to a combination of hardware and software that runs by the corresponding hardware. The hardware may be a data processing device including Central Processing Unit (CPU) or other processor. Additionally, the software that runs by the hardware may refer to a process in execution, an object, an executable, a thread of execution and a program For stability determination and a task, the humanoid 1 may use Center of Mass (CoM) (hereinafter referred to as 'CoM') information and Zero Moment Point (ZMP) (hereinafter referred to as 'ZMP') information for balance control of the robot. A simplified version using CoM of the biped robot 1 and ZMP of the biped robot 1 or a point at which the moment with respect to the ground is 0 is the linear inverted pendulum model.

The control input generation unit 100 may generate ZMP. The control input generation unit 100 may generate a ZMP value based on the current CoM value, and provide the generated ZMP to the control output generation unit 110.

The control output generation unit 110 may generate a CoM position and velocity signal of the humanoid based on the inputted ZMP. As shown in FIG. 2, the supporting region S may be set based on a region in which both feet of the humanoid 1 are located. The supporting region S may include all a region in which both feet of the humanoid 1 are supported and a region defined between the both feet. When the ZMP is located in the supporting region S, it may be defined that the humanoid is in stable state. Accordingly, a value of ZMP may determine a normal or abnormal task of the humanoid, and may be main data that generates a task signal of the humanoid.

The CoM position and velocity generated by the control output generation unit 110 may be used to make CoM position and velocity that will be generated subsequently.

That is, ZMP is not considered when generating initial position and velocity of CoM, but after ZMP is generated, the next CoM position and velocity may be generated, considering the ZMP. Hereinafter, the relation between CoM and ZMP and its generation will be described in more detail.

The complex kinematic equations of a multi-degree-of-freedom robot can be expressed as differential equations for CoM and ZMP. Because the differential equation is coupled between each axis and has a nonlinear component, finding the solution is very difficult. Accordingly, the linear inverted pendulum model is interpreted under the assumption that it is the plane on which the movement of CoM of the robot in the z-axis is constant and changes in angular momentum of CoM over time are very small, and by the two assumptions, the relation between ZMP and CoM coupled between each axis is decoupled.

Under the above assumption, the relation equation of CoM and ZMP may be represented as shown in the following [Equation 1]:

$$G_c : \begin{cases} m\ddot{c}_x = \dfrac{mg}{c_{z0}}(c_x - p_x) + fx \\ m\ddot{c}_y = \dfrac{mg}{c_{z0}}(c_y - p_y) + fy \end{cases} \quad \text{[Equation 1]}$$

In the above [Equation 1], $C_x$, $C_y$ denote the plane (x-y) position of CoM at a constant height $C_{zo}$, $P_x$, $P_y$ denote the plane (x-y) position of ZMP, g denotes the gravitational acceleration, m denotes the mass of the humanoid, $f_x$, $f_y$ denote the external force applied to the CoM of the humanoid, and $\dot{c}_x$, $\dot{c}_y$ denote the CoM velocity on the x-axis and the CoM velocity on the y-axis respectively.

In the first equation of the above [Equation 1], without considering the external force applied to CoM of the humanoid, the equation is rewritten based on the x-axis component of the plane, obtaining [Equation 2]:

$$\dot{x} = Ax + B_2 u \quad \text{[Equation 2]}$$

In the above [Equation 2], $$x := [c_x \ \dot{c}_x]^T, u := p_x,$$
$$A = \begin{bmatrix} 0 & 1 \\ \omega_0^2 & 0 \end{bmatrix}, B_2 = \begin{bmatrix} 0 \\ -\omega_0^2 \end{bmatrix}, \omega_0^2 := g/c_{z0}.$$

From the second equation of the above [Equation 1], the same equation as [Equation 2] with $x := [c_y \ \dot{c}_y]^T$, $u := p_y$, may be obtained. This is defined based on the y-axis component of the plane. Hereinafter, description is made based on [Equation 2], and the above description may be equally applied to the following same equation.

The above [Equation 2] is a continuous-time system, and is controllable. Accordingly, CoM position and velocity x and ZMP position u form a full-state feedback system that is proportional to a closed loop gain value K, and this may be defined as the following [Equation 3]:

$$u = Kx. \quad \text{[Equation 3]}$$

In the linear inverted pendulum model, CoM position and velocity x and ZMP position u may form a closed loop.

To process information inputted in a predetermined time interval, its discretization may be needed, and the above [Equation 2] and [Equation 3] may be discretized into [Equation 4] and [Equation 5]. Here, [Equation 4] and [Equation 5] may be a mathematical expression sampled according to the sampling period, and may be a discrete-time dynamics equation discretized by applying the non-pathological sampling frequency $W_s$.

Here, the two eigenvalues of the square matrix A can be calculated through a characteristic equation(det(A−λI)=0) well known in the art. When two eigenvalues of A have equal real parts and imaginary parts that differ by an integral multiple of the sampling frequency $W_s$, it is defined that the sampling frequency $W_s$ is pathological, and if not so, it is defined that the sampling frequency $W_s$ is non-pathological. Considering the non-pathological sampling frequency $W_s$, when sampling ($W_s = 2\pi/T$) according to the non-pathological sampling period T, the discretized dynamics equation that guarantees controllability of conventional analog input signal may be computed.

$$\xi(k+1) = A_d \xi(k) + B_{2d} \psi(k) \quad \text{[Equation 4]}$$

where, $\xi(k) := x(kT)$, $\psi(k) := u(kT)$,
$A_d := \exp(AT)$, $B_{2d} := \int_0^T \exp(A\theta) B_2 d\theta$,
if $(A, B_2)$ have controllability, $(A_d, B_{2d})$ also have controllability.

$$\psi(k) = K\xi(k) \quad \text{[Equation 5]}$$

As shown in FIG. 4, the control output generation unit 110 may determine CoM position and velocity through the discretized [Equation 4], and the control input generation unit 100 may determine ZMP through [Equation 5]. The ZMP generated previously may be provided to generate the next CoM. The ZMP value generated by the control input generation unit 100 is a value that guarantees controllability, thereby providing more stable and precise balance control.

Based on the fact that the control input generation unit 100 and the control output generation unit 110 are represented by the above [Equation 5] and [Equation 4], initial position and initial velocity values of CoM that can guarantee stability of the humanoid may be computed.

Here, the guaranteed stability of the humanoid signifies that ZMP is always inside the supporting region S shown in FIG. 2. The control input generation unit 100 and the control output generation unit 110 form a closed loop system, and through the closed loop system, initial position and initial velocity of CoM always satisfying $\psi(k) \in S$ may be computed. The control of the humanoid may be performed by setting the computed result as a basic value.

That is, with [Equation 4] and [Equation 5] in combination, the following [Equation 6] representing a closed loop system may be computed, and initial position and initial velocity of CoM may be computed through [Equation 6].

$$\xi(k+1) = (A_d + B_{2d} K) \xi(k) =: A_{2d} \xi(k) \quad \text{[Equation 6]}$$

Because the non-pathological sampling frequency $W_s$ is considered in the present disclosure, $A_d$, $B_{2d}$ have a controllable property, and thus $A_{2d}$ with a combination of them may correspond to a diagonalizable matrix. That is, $A_{2d}$ may be a diagonalizable matrix by the definition of controllability for $(A_d, B_{2d})$.

In terms of the length $\alpha_x$ of width of the supporting region S shown in FIG. 2, [Equation 5] may be transformed to the following [Equation 7].

$$\zeta(k) = C_d \xi(k) \quad \text{[Equation 7]}$$

Here, $$C_d := \dfrac{2}{\alpha_x} K,$$

and ZMP being inside the supporting region S shown in FIG. 2 may be given as $\|\zeta\|_\infty \leq 1$. To compute the initial value $\xi(0)$ condition of CoM satisfying the condition that ZMP is inside the supporting region S, $\alpha_x$ is length of width of the supporting region S, [Equation 7] may be defined as the following [Equation 8]:

$$\zeta(k) = C_d A_{2d}^k \xi(0) \quad \text{[Equation 8]}$$

Additionally, when ZMP is inside the supporting region S, a set of initial values $\xi(0)$ of CoM may be computed as shown in the following [Equation 9]:

$$\mathcal{O}_N\{\xi(0) \| C_d A_{2d}^k \xi(0)| \leq 1 \text{ for } k=0, \ldots N\} \quad \text{[Equation 9]}$$

Here, N is infinite, but in fact, it is impossible to compute this infinite set, and hereinafter, a set of initial values $\xi(0)$ of CoM of finite natural number is computed by proving that a result value of a set of infinite numbers is equal to a result value of finite natural number.

First, $\mathcal{O}_0$ is computed, and using this, $\beta$ is defined as the following [Equation 10]:

$$\beta := \max_{\xi(0) \in O_\theta} |\xi(0)|_\infty \quad \text{[Equation 10]}$$

Subsequently, $A_{2d}$ is diagonalized as shown in the following [Equation 11]:

$$A_{2d} = P\mathrm{diag}[\lambda_1, \lambda_2] P^{-1} \quad \text{[Equation 11]}$$

Here, when $\lambda_1$, $\lambda_2$ correspond to eigenvalues of $A_{2d}$, and $\rho$ is defined as the spectrum radius of $A_{2d}$, $\rho = \max\{|\lambda_1|, |\lambda_2|\}$.

Subsequently, the finite natural number $N_o$ is defined as shown in the following Equation 12:

$$N_0 := \max\left\{0, \left\lceil \log_\rho \frac{1}{\|C_d P\|_\infty \cdot \|P^{-1}\|_\infty \cdot \beta} \right\rceil\right\} \quad \text{[Equation 12]}$$

Subsequently, assume that a set of infinite numbers is equal to a set of finite natural numbers $N_o$ as shown in the following [Equation 13]:

$$\mathcal{O}_{N_0} \mathcal{O}_\infty \quad \text{[Equation 13]}$$

Here, because $\mathcal{O}_0 \supset \mathcal{O}_1 \supset \ldots \supset \mathcal{O}_\infty$ is evident by the definition of $\mathcal{O}_N$, $\mathcal{O}_{N_0} \supset \mathcal{O}_\infty$ may be satisfied, and when $\mathcal{O}_{N_0} \subset \mathcal{O}_\infty$ is satisfied, the above [Equation 13] may be satisfied. In arbitrary $\xi(0) \in \mathcal{O}_{N_0}$ and $N_1 \in \mathbb{N}$, the following [Equation 14] may be derived:

$$|C_d A_{2d}^{N_0+N_1} \xi(0)| = |C_d P \mathrm{diag}[\lambda_1^{N_0+N_1}, \lambda_2^{N_0+N_1}] P^{-1} \xi(0)| \leq$$
$$\rho^{N_0+N_1} \cdot \|C_d P\|_\infty \cdot \|P^{-1}\|_\infty \cdot |\xi(0)|_\infty \leq$$
$$\rho^{N_0+N_1} \cdot \|C_d P\|_\infty \cdot \|P^{-1}\|_\infty \cdot \max_{\xi(0) \in O_{N_0}} |\xi(0)|_\infty \quad \text{[Equation 14]}$$

In terms of $\mathcal{O}_{N_0} \subset \mathcal{O}_0$ and the above [Equation 10], the above [Equation 14] may be rewritten as the following [Equation 15]:

$$|C_d A_{2d}^{N_0+N_1} \xi(0)| \leq \rho^{N_0+N_1} \cdot \|C_d P\|_\infty \cdot \|P^{-1}\|_\infty \cdot \beta = (\rho^{N_0} \cdot \|C_d P\|_\infty \cdot \|P^{-1}\|_\infty \cdot \beta) \cdot \rho^{N_1} < 1 \quad \text{[Equation 15]}$$

Here, [Equation 15] signifies that the following [Equation 16] may be established:

$$\xi(0) \in \mathcal{O}_{N_0} \Rightarrow \xi(0) \in \mathcal{O}_{N_0+N_1} \quad \text{[Equation 16]}$$

The above [Equation 16] signifies that $\mathcal{O}_{N_0} \subset \mathcal{O}_{N_0+H_1}$ may be established for N1 including all the natural numbers, which in turn, signifies that $\mathcal{O}_{N_0} \subset \mathcal{O}_\infty$ is established.

Accordingly, because $\mathcal{O}_{N_0} \subset \mathcal{O}_\infty$ and $\mathcal{O}_{N_0} \subset \mathcal{O}_\infty$ are all satisfied, the assumption of the above [Equation 13] may be proved. That is, when ZMP is inside the supporting region S, it is found that in a set of initial values $\xi(0)$ of CoM, the result of computing N to the finite natural number $N_0$ is equal to the result of computing N to the infinite. With [Equation 6] based on the closed loop system including the control input generation unit 100 and the control output generation unit 110 according to an embodiment of the present disclosure, CoM initial value $\xi(0)$ that can guarantee ZMP being always inside the supporting region S may be determined through the result of computing the above [Equation 9] to the finite number $N_0$. Here, the initial value may be the position and velocity $c_x$, $\dot{c}_x$ of x-axis, and the initial value $c_y$, $\dot{c}_y$ corresponding to y-axis of CoM may be also computed through the same process.

That is, the above-described system may be initiated based on the initial values of CoM computed in this way. Its experimental result data is shown in FIGS. 5A, 5B, 6A and 6B. The specification of the humanoid used in the experiment is as shown in the following Table 1.

TABLE 1

| SPECIFICATIONS OF MAHRU-R. | |
|---|---|
| Height | 1.35 m |
| CoM Height | 0.697 m |
| Weight | 50 kg |
| Supporting Region | 0.31 m × 0.23 m |

FIG. 5A shows changes in CoM($c_x$, $\dot{c}_x$) depending on the case in which initial data $c_x$, $\dot{c}_x$ corresponding to the x-axis of CoM is inside the stable region obtained by [Equation 12] (case i) and the case in which initial data $c_x$, $\dot{c}_x$ corresponding to the x-axis of CoM is not inside the stable region (case ii). FIG. 5B shows changes in ZMP($P_x$) depending on the case in which initial data $c_x$, $\dot{c}_x$ corresponding to the x-axis of CoM is inside the stable region obtained by [Equation 12] (case i) and the case in which initial data $c_x$, $\dot{c}_x$ corresponding to the x-axis of CoM is not inside the stable region (case ii). In the case in which initial data $c_x$, $\dot{c}_x$ corresponding to the x-axis of CoM is inside the stable region (case i), ZMP($P_x$) may continuously stay in the supporting region for the operation time, but in the case in which initial data $c_x$, $\dot{c}_x$ corresponding to the x-axis is not inside the stable region (case ii), it is found that ZMP($P_x$) deviates from the supporting region.

FIG. 6A shows changes in CoM($c_y$, $\dot{c}_y$) depending on the case in which initial data $c_y$, $\dot{c}_y$ corresponding to the y-axis of CoM is inside the stable region (case i) and the case in which initial data $c_y$, $\dot{c}_y$ corresponding to the y-axis of CoM is not inside the stable region (case ii). FIG. 6B shows changes in ZMP($P_y$) depending on the case in which initial data $c_y$, $\dot{c}_y$ corresponding to the y-axis of CoM is inside the stable region (case i) and the case in which initial data $c_y$, $\dot{c}_y$ corresponding to the y-axis of CoM is not inside the stable region (case ii). In the case in which initial data $c_y$, $\dot{c}_y$ corresponding to the y-axis of CoM is inside the stable region (case i), ZMP($P_y$) may continuously stay in the supporting region for the operation time, but in the case in which initial data $c_y$, $\dot{c}_y$ corresponding to the y-axis is not inside the stable region (case ii), it is found that ZMP($P_y$) deviates from the supporting region.

As described above, the system 10 for balance control of a humanoid of the present disclosure provides a balance control method with guaranteed stability by performing an operation based on initial data related to CoM position and velocity by which ZMP is always inside the supporting region.

Additionally, the system 10 for balance control of a humanoid of the present disclosure may provide a system for balance control of a humanoid with improved precision and stability by computing CoM and ZMP using the dynamics equation sampled by applying the non-pathological sampling frequency.

Hereinafter, a method for balance control of a humanoid according to an embodiment of the present disclosure will be described.

The method for balance control of a humanoid according to an embodiment of the present disclosure may determine CoM of the humanoid and ZMP of the humanoid in an environment in which controllability is guaranteed.

Here, a control system of a humanoid that performs each of the above-described steps may be the system 10 for balance control of a humanoid of FIG. 1 as described above, and its detailed description is omitted herein. Additionally, for description of this embodiment, reference may be made to FIGS. 1 to 6.

The system 10 for balance control of a humanoid may include the control input generation unit 100 and the control output generation unit 110.

The step of determining ZMP of the humanoid with respect to the ground may be generated by the control input generation unit 100.

The step of determining CoM position and velocity of the humanoid may be performed by the control output generation unit 110. Here, the control input generation unit 100 and the control output generation unit 110 may determine the ZMP and the CoM position and velocity, respectively, by applying a discrete-time dynamics equation sampled by applying non-pathological sampling frequency.

Additionally, the control output generation unit 110 may determine the CoM position and velocity through discretized [Equation 4], and the control input generation unit 100 may determine the ZMP through [Equation 5]:

$$\xi(k+1) = A_d \xi(k) + B_{2d} \psi(k) \quad \text{[Equation 4]}$$

(where $\xi(k) := x(kT)$, $\psi(k) := u(kT)$, T: the non-pathological sampling period, $x := [c_x \ \dot{c}_x]^T$ $u := p_x$ or $x := [c_y \ \dot{c}_y]^T$ $u := p_y$, $C_x$, $C_y$ are the plane (x-y) position of CoM at a constant height $C_{zo}$, $P_x$, $P_y$ are the plane (x-y) position of ZMP, and $\dot{c}_x$ $\dot{c}_y$ are the CoM velocity on the x-axis and the CoM velocity on the y-axis, respectively.

$$A_d := \exp(AT), \ B_{2d} := \int_0^T \exp(A\theta)B_2 d\theta,$$

$$A = \begin{bmatrix} 0 & 1 \\ \omega_0^2 & 0 \end{bmatrix}, \ B_2 = \begin{bmatrix} 0 \\ -\omega_0^2 \end{bmatrix}, \ \omega_0^2 := g/c_{z0}.$$

$$\psi(k) = K\xi(k) \quad \text{[Equation 5]}$$

where K is the closed loop gain value.

Here, [Equation 4] and [Equation 5] may be a mathematical expression sampled according to the sampling period, and may be a discrete-time dynamics equation discretized by applying the non-pathological sampling frequency $W_s$.

Here, when two eigenvalues of A have equal real parts and imaginary parts that differ by the sampling frequency $W_s$, it is defined that the sampling frequency $W_s$ is pathological, and if not so, it is defined that the sampling frequency $W_s$ is non-pathological. Considering the non-pathological sampling frequency $W_s$, when sampling according to the non-pathological sampling period T ($W_s = 2\pi/T$), the discretized dynamics equation that guarantees controllability of conventional analog input signal may be computed.

As shown in FIG. 2, the supporting region S may be set based on a region in which both feet of the humanoid 1 are located. The supporting region S may include all a region in which both feet of the humanoid 1 are supported and a region defined between the both feet. When the ZMP is located in the supporting region S, it may be determined that the humanoid is stable. That is, ZMP being inside the supporting region S represents that balance of the biped robot 1 is maintained, and a value of ZMP may determine a normal or abnormal task of the humanoid, and may be main data that generates a task signal of the humanoid.

CoM generated by the control output generation unit 110 may be used to generate the next ZMP. That is, after the step of generating a CoM signal, the step of generating the next ZMP by using the value may be repeated. As described above, the control input generation unit 100 may generate ZMP based on information of CoM. That is, based on the inputted CoM information, ZMP reflecting it is generated. ZMP used to determine the current CoM is a value determined based on the previous CoM.

Here, the method for balance control of a humanoid according to this embodiment includes the step of computing initial position and initial velocity of CoM by which ZMP is always located inside the supporting region S.

A closed loop system including the control input generation unit 100 and the control output generation unit 110 is formed, and the closed loop system may be defined as [Equation 6]:

$$\xi(k+1) = (A_d + B_{2d}K)\xi(k) =: A_{2d}\xi(k) \quad \text{[Equation 6]}$$

The initial position and initial velocity of CoM by which ZMP is always located inside the supporting region S may be computed through the above [Equation 6].

A set of initial positions and initial velocities of CoM may be computed as shown in the following [Equation 9]:

$$\mathcal{O}_N = \{\xi(0) \mid |C_d A_{2d}^k \xi(0)| \le 1 \ \text{for} \ k=0, \ldots, N\} \quad \text{[Equation 9]}$$

(where $$C_d := \frac{2}{\alpha_x} K,$$

$A_{2d} A_d + B_{2d} K$, $\xi(0)$=Initial position and initial velocity of CoM)

Because the non-pathological sampling frequency $W_s$ is considered in the present disclosure, $A_d$ and $B_{2d}$ have a controllable property, and thus $A_{2d}$ with a combination of them may correspond to a diagonalizable matrix. That is, $A_{2d}$ may be a diagonalizable matrix by the definition of controllability.

In the above set, N may be substantially infinite, but as described in the above-described system for balance control of a humanoid, the result of computing N to the finite natural number $N_o$ is equal to the result of computing N to the infinite. Accordingly, the control input generation unit 100 according to an embodiment of the present disclosure has the initial value of CoM obtained through the result of computing the above [Equation 9] to the finite number $N_o$ as an input value, and as a result, it can guarantee that ZMP is always inside the supporting region S. Here, the initial value may be the position and velocity $c_x$, $\dot{c}_x$ of the x-axis, and initial value $c_y$, $\dot{c}_y$ corresponding to the y-axis of CoM may be also computed through the same process.

The above-described method may be initiated based on the initial values of CoM computed in this way.

The operation by the method for balance control of a humanoid according to the embodiments as described above may be implemented as a computer program at least in part and recorded on a computer-readable recording media. The computer-readable recording medium having recorded thereon the program for implementing the operation by the method for balance control of a humanoid according to the embodiments includes any type of recording device in which computer-readable data is stored. Examples of the computer-readable recording media include ROM, RAM, CD-ROM, magnetic tape, floppy disk, and optical data storing devices. Additionally, the computer-readable recording media is distributed over computer systems connected via a network so that computer-readable codes may be stored and executed in distributed manner. Additionally, functional programs, codes and code segments for realizing this embodiment will be easily understood by those having ordinary skill in the technical field to which this embodiment belongs.

The present disclosure has been hereinabove described with reference to the embodiments, but the present disclosure should not be interpreted as being limited to these embodiments or drawings, and it will be apparent to those skilled in the corresponding technical field that modifications and changes may be made thereto without departing from the spirit and scope of the present disclosure set forth in the appended claims.

DETAILED DESCRIPTION OF MAIN ELEMENTS

10: System for balance control of humanoid
100: Control input generation unit
110: Control output generation unit

What is claimed is:

1. A system for balance control of a humanoid, comprising a processor configured to implement:
a control input generation unit which determines Zero Momentum Position (ZMP) of the humanoid with respect to ground; and
a control output generation unit which determines Center of Mass (CoM) position and velocity of the humanoid,
wherein the control input generation unit and the control output generation unit determine the ZMP and the CoM position and velocity, respectively, by applying a discrete-time dynamics equation sampled by applying a non-pathological sampling frequency,
wherein the control output generation unit determines the CoM position and velocity by applying the discrete-time dynamics equation represented by the following [Equation 4], and
the control input generation unit determines the ZMP by applying the discrete-time dynamics equation represented by the following [Equation 5]:

$$\xi(k+1) = A_d \xi(k) + B_{2d} \psi(k) \quad \text{[Equation 4]}$$

(where $\xi(k) := x(kT)$, $\psi(k) := u(kT)$, T: a non-pathological sampling period, $$A_d := \exp(AT),\ B_{2d} := \int_0^T \exp(A\theta) B_2 d\theta,$$

$$A = \begin{bmatrix} 0 & 1 \\ \omega_0^2 & 0 \end{bmatrix},\ B_2 = \begin{bmatrix} 0 \\ -\omega_0^2 \end{bmatrix},\ \omega_0^2 := g/c_{z0}.$$

$$\psi(k) = K\xi(k) \quad \text{[Equation 5]}$$

where K is a closed loop gain value.

2. The system for balance control of a humanoid according to claim 1, wherein when a region in which both feet of the humanoid are located and a region defined between the both feet are defined as a supporting region,
a closed loop system including the control input generation unit and the control output generation unit is formed, and the closed loop system is defined as [Equation 6], and
initial position and initial velocity of the CoM by which the ZMP is always located inside the supporting region is computed through the above [Equation 6]:

$$\xi(k+1) = (A_d + B_{2d} K)\xi(k) =: A_{2d} \xi(k). \quad \text{[Equation 6]}$$

3. The system for balance control of a humanoid according to claim 2, wherein a set of initial positions and initial velocities of the CoM is computed as shown in the following [Equation 9]:

$$\mathcal{O}_N = \{\xi(0) | |C_d A_{2d}^k \xi(0)| \leq 1 \text{ for } k=0,\ldots,N\} \quad \text{[Equation 9]}$$

(where $$C_d := \frac{2}{\alpha_x} K,$$

$A_{2d} = A_d + B_{2d} K$, $\xi(0)$=the initial position and initial velocity of the CoM).

4. The system for balance control of a humanoid according to claim 3, wherein the $A_{2d}$ is a diagonalizable matrix.

5. A method for balance control of a humanoid using a system for balance control of a humanoid including a control input generation unit and a control output generation unit, the method for balance control of a humanoid comprising:
determining, by the control input generation unit, Zero Momentum Position (ZMP) of the humanoid with respect to ground; and
determining, by the control output generation unit, Center of Mass (CoM) position and velocity of the humanoid,
wherein the control input generation unit and the control output generation unit determine the ZMP and the CoM position and velocity, respectively, by applying a discrete-time dynamics equation sampled by applying a non-pathological sampling frequency,
wherein the control output generation unit determines the CoM position and velocity by applying the discrete-time dynamics equation represented by the following [Equation 4], and
the control input generation unit determines the ZMP by applying the discrete-time dynamics equation represented by the following [Equation 5]:

$$\xi(k+1) = A_d \xi(k) + B_{2d} \psi(k) \quad \text{[Equation 4]}$$

(where $\xi(k) := x(kT)$, $\psi(k) := u(kT)$, T: a non-pathological sampling period, $$A_d := \exp(AT), \quad B_{2d} := \int_0^T \exp(A\theta) B_2 d\theta,$$

$$A = \begin{bmatrix} 0 & 1 \\ \omega_0^2 & 0 \end{bmatrix}, \quad B_2 = \begin{bmatrix} 0 \\ -\omega_0^2 \end{bmatrix}, \quad \omega_0^2 := g/c_{z0}.$$

$$\psi(k) = K\xi(k) \qquad \text{[Equation 5]}$$

where K is a closed loop gain value.

6. The method for balance control of a humanoid according to claim 5, wherein when a region in which both feet of the humanoid are located and a region defined between the both feet are defined as a supporting region, a closed loop system including the control input generation unit and the control output generation unit is formed, and the closed loop system is defined as [Equation 6], and initial position and initial velocity of the CoM by which the ZMP is always located inside the supporting region is computed through the above [Equation 6]:

$$\xi(k+1) = (A_d + B_{2d}K)\xi(k) =: A_{2d}\xi(k). \qquad \text{[Equation 6]}$$

7. The method for balance control of a humanoid according to claim 6, wherein a set of initial positions and initial velocities of the CoM is computed as shown in the following [Equation 9]:

$$\mathcal{O}_N = \{\xi(0) \| C_d A_{2d}^k \xi(0) | \leq 1 \text{ for } k=0,\ldots,N\} \qquad \text{[Equation 9]}$$

(where $$C_d := \frac{2}{\alpha_x} K,$$

$A_{2d} = A_d + B_{2d}K$, $\xi(0)$=the initial position and initial velocity of the CoM).

8. The method for balance control of a humanoid according to claim 7, wherein the $A_{2d}$ is a diagonalizable matrix.

* * * * *